(12) United States Patent
Gabalski et al.

(10) Patent No.: US 7,189,111 B2
(45) Date of Patent: Mar. 13, 2007

(54) STAND-OFF BRACKET FOR SECURING A WIRE HARNESS CONNECTOR ASSEMBLY TO DC ELECTRIC MOTOR AND ASSOCIATED METHOD

(75) Inventors: Jeffrey A. Gabalski, West Bloomfield, MI (US); Stephen Bruck, Howell, MI (US)

(73) Assignee: BAE Industries, Inc., Centerline, MI (US)

( * ) Notice: Subject to any disclaimer, the term of this patent is extended or adjusted under 35 U.S.C. 154(b) by 0 days.

(21) Appl. No.: 11/132,965

(22) Filed: May 19, 2005

(65) Prior Publication Data

US 2006/0264095 A1   Nov. 23, 2006

(51) Int. Cl.
   *H01R 13/60*   (2006.01)
(52) U.S. Cl. ..................................... 439/542
(58) Field of Classification Search ................ 439/542, 439/327; 310/71, 89, 239
   See application file for complete search history.

(56) References Cited

U.S. PATENT DOCUMENTS

| 4,688,869 | A | * | 8/1987 | Kelly ........................ 439/209 |
| 4,709,124 | A | | 11/1987 | Wheeler et al. .............. 174/65 |
| 5,025,184 | A | * | 6/1991 | Sekine et al. ................. 310/71 |
| 5,057,732 | A | | 10/1991 | Fukaya ....................... 310/208 |
| 5,170,307 | A | * | 12/1992 | Nacewicz et al. ............ 361/24 |
| 5,814,911 | A | * | 9/1998 | Daniels .................... 310/68 R |
| 6,317,304 | B1 | | 11/2001 | De Campos ................. 361/22 |
| 6,561,822 | B2 | | 5/2003 | Depp et al. ................ 439/76.2 |
| 6,565,370 | B1 | * | 5/2003 | Kabat et al. ................ 439/135 |
| 6,674,195 | B2 | | 1/2004 | Yagyu et al. ................. 310/71 |
| 6,841,730 | B2 | * | 1/2005 | Medeiros et al. ............. 174/50 |

FOREIGN PATENT DOCUMENTS

| EP | 0516422 A2 | 2/1992 |
| JP | 04208043 A | 7/1992 |
| JP | 09046961 A | 2/1997 |

* cited by examiner

*Primary Examiner*—Tulsidas C. Patel
*Assistant Examiner*—Phuongchi Nguyen
(74) *Attorney, Agent, or Firm*—Gifford, Krass, Groh, Sprinkle, Anderson & Citkowski, P.C.

(57) ABSTRACT

An assembly and associated method for securing a connector to an electric motor. An elongated bracket has a specified shape and size and is constructed of a spring steel material. A pair of screws secure the bracket at a first end to a supporting location associated with the electric motor. A downwardly projecting portion associated with an intermediate location of the bracket biases the bracket in an angled fashion relative to the motor. An extending location of the bracket is arrayed in offset fashion relative a surface and includes an end-angled tab adapted to receive the connector in securely engaged fashion.

10 Claims, 2 Drawing Sheets

STAND-OFF BRACKET FOR SECURING A WIRE HARNESS CONNECTOR ASSEMBLY TO DC ELECTRIC MOTOR AND ASSOCIATED METHOD

BACKGROUND OF THE INVENTION

1. Field of the Invention

The present invention relates generally to electrical connector assemblies. More specifically, the present invention discloses a bracket and associated method for securing, to an exterior of a DC electric motor, for electrically communicating a wire harness in both a secure and a buss, squeak and rattle preventative fashion.

2. Description of the Prior Art

The prior art is well documented with various types of electrical connector housing and assemblies. Most typically, these include some form of plasticized connector or plug-shaped housing which is configured for receiving a wire harness input in a snap-fit fashion.

In one particular arrangement, it is desirable to secure a harness connector to a DC motor, such as incorporated into a powered vehicle seat. Prior art techniques have included taping the plastic connector housing to the exterior surface of the DC motor.

In one conventional application, electrician's tape has been employed in a number of wraps about an exterior of the DC motor housing in order to secure the electrical connector in place. Shortcomings associated with such rudimentary attachment techniques include both the risk of the connector housing coming loose as a result of unraveling of the tape, as well as the occurrence of buss, squeak and rattle conditions associated with the connector assembly, and as a result of misalignment or movement relative to the attached surface of the motor housing.

Other applications of the prior art include the Japanese 04208043 patent abstract, which teaches a bracket design affixed to a motor casing as well as to a connector. Japanese reference 09046961 teaches another type of motor connector for use with a brushless motor.

De Campos, U.S. Pat. No. 6,317,304, teaches an assembly of electric motor-controlling components for use with an electric motor. Reference in particular is made to the electrically conductive elements mounted in regions of a base component. Electrically conductive resilient contact members are provided on the electrically conductive elements and butt against a conventional PTC element positioned in a region of the base such that it is in pressure contact with and between the resilient members.

Finally, European Patent No. 0 516 442 A2 teaches a split phase electric motor starter and protector having a housing which receives a PTC starter switch and a motor protector. Various wiring options are provided for connecting the PTC switch and, if desired, a capacitor to a motor depending upon the particular requirements of an application. The housing optionally accommodates a capacitor support bracket.

SUMMARY OF THE PRESENT INVENTION

The present invention teaches a spring steel bracket fastener connected to an exterior surface of a DC electrical motor, and such as is particularly associated with a vehicle seat. The present invention in particular provides for biasing and secure engagement of the electrical connector, and associated wire harness input plug, in a buss/squeak/rattle preventative fashion.

The bracket is provided as an elongated and stainless steel construction with a first and substantially flattened end secured by a pair of screws to a supporting surface location associated with the motor, typically a DC electric motor associated with a powered vehicle seat. In order to establish its biased and offset arrangement, a depression is formed, such as by a punch, at a selected intermediate location of the bracket, resulting in an opposite defined projection abutting the surface of the motor.

As a result, the overall elongated body of the bracket extends in a substantially angled and biased fashion relative to the surface of the motor. An extending and end-angled tab is defined in the bracket, the tab being configured for biasingly engaging and seating thereupon an electrical connector housing. An electrical conduit extends from the connector housing to the DC motor and communicates with an input plug engaged with the connector, the plug in turn being formed at an end of an extending wire harness which is desired to be connected to the DC motor.

An associated method for forming and attaching a bracket for communicating a connector with the DC motor is also provided and includes the steps of fashioning an elongated and substantially flattened bracket of a resilient material, attaching a first end of the bracket to a surface location of the electric motor, and engaging the connector with a second projecting end of the bracket. Additional steps include forming the underside projection in the bracket to provide biasing stand-off, as well as bending the second projecting (tab) end in order to define a lead-in angle for engaging the connector.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
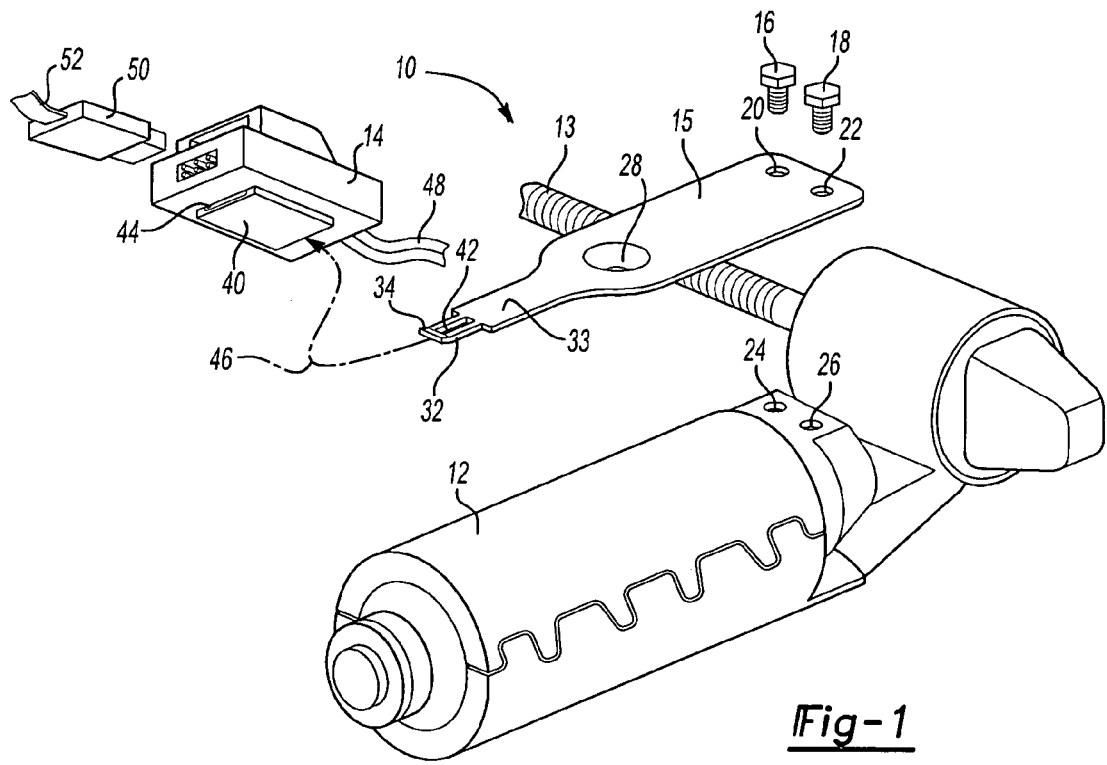
FIG. 1 is an exploded perspective view of the electrical connector bracket for fixedly attaching, in both a biased and stand-off fashion, a wire harness associated with an electrical connector assembly to a DC electric motor according to a preferred embodiment of the present invention.
Figure 2:
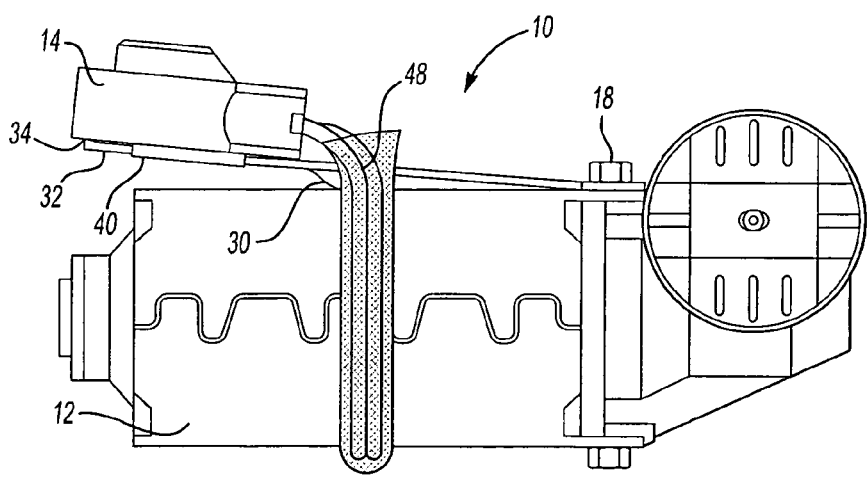
FIG. 2 is an assembled side plan and environmental view of the stand-off bracket assembly secured to the electric motor housing according to the present invention.

Referring now to FIGS. 1 and 2, successive exploded perspective and side plan views are illustrated, at 10 respectively, of a bracket which is securely attached to a DC powered electrical motor 12, such as including an appropriate gear box for operating a drive screw, see at 13, for operating a powered vehicle seat assembly (not shown). The bracket 10 is utilized to in turn mount an electrical connector 14 in a fixed and buss/squeak/rattle preventative fashion to the electric motor 12.

A bracket 12 is typically formed from an elongated and stainless steel construction (such as an SAE 1050 steel 0.75"×0.13") and, when configured in its final shape, includes a first and substantially flattened end 15 secured by a pair of screws 16 and 18 to a supporting surface location associated with the motor. A pair of apertures 20 and 22 are formed through the bracket 10, proximate its flattened end 15, and which matingly align with additional support surface apertures 24 and 26 in order to receive the screws 16 and 18 and to mount the bracket 10 to the motor support surface in the manner illustrated in FIG. 2.

Figure 3:
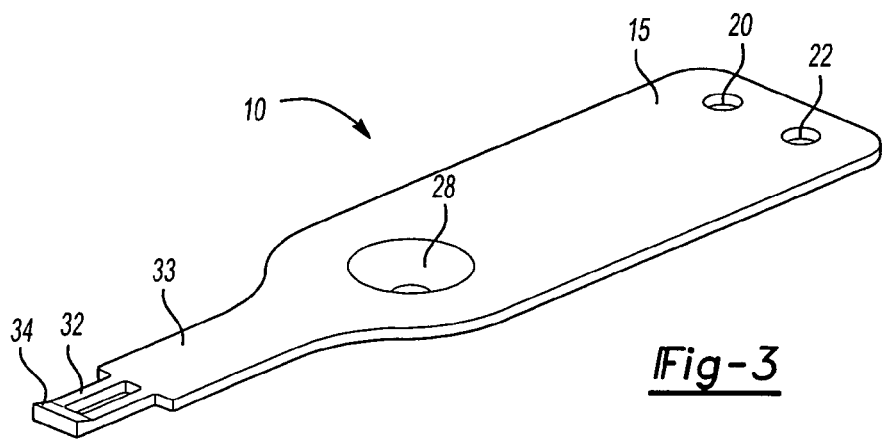
FIG. 3 is a perspective view of the stand-off bracket according to the present invention.
Figure 4:
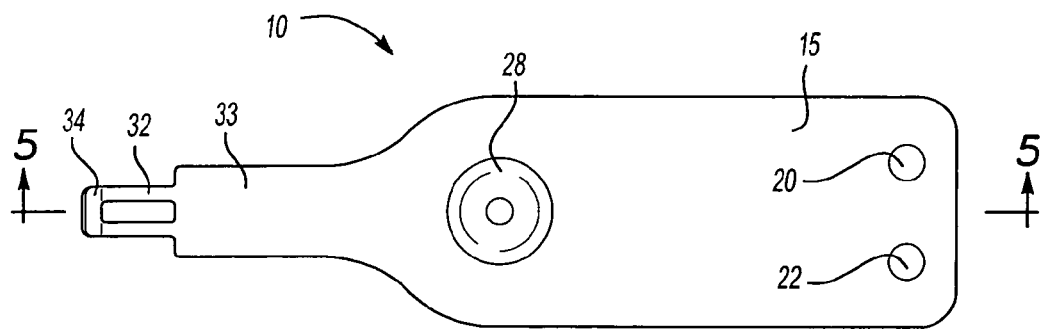
FIG. 4 is a top plan view of the stand-off bracket.
Figure 5:
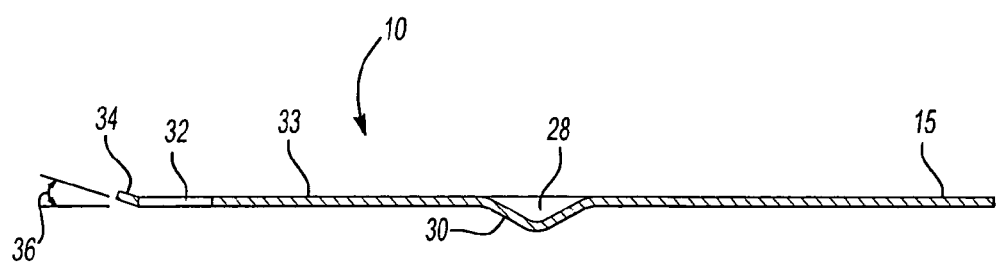
FIG. 5 is a side plan view of the substantially planar shaped bracket and illustrating both the features of a mid-point formed stand-off depression, as well as an end-angled portion for facilitating snap-fit engagement of the associated electrical connector housing.

In order to establish its biased and offset arrangement, and referencing also in succession each of the individual bracket views of FIGS. 3–5, a depression 28 is formed, such as by a punch (not shown), at a selected intermediate location of the bracket 10, resulting in an opposite defined projection, see in particular at 30 in FIGS. 1 and 5, abutting the surface of the motor 12. As best shown by the side plan illustration of FIG. 2, the depression (upper surface 28) and corresponding projection (downward surface 30) result in the mounted bracket 10 being angled upwardly and away from the exterior surface of the motor 12 in a biased fashion. As a result, the overall elongated body of the bracket 10 extends in a substantially angled and biased fashion relative to the surface of the motor 12, thus providing the desired degree of buss/squeak/rattle protection which would otherwise occur as a result of loose or non-biasing engagement of the connector 14.

An extending and end-angled tab 32 is defined in a forward extending and narrowed portion 33 associated with the bracket 10. The tab 32 is configured, such as by being bent along its edge 34 in order to define a lead-in angle 36, see FIG. 6, relative to the main extending plane associated with the bracket 10 for biasingly engaging and seating thereupon an electrical connector housing. In a preferred variant, a lead-in angle 36 in the area of 15–17° is considered optimal for engaging a corresponding underside mounting location 40 associated with the electrical connector 14, although lead-in angles according to other ranges and configurations are contemplated within the ordinary skill of one in the art.

A lengthwise slot 42 is defined in the tab 32, the tab engaging an underside mounting location 40 of the connector 14, and in particular a corresponding aperture 44 associated with the mounting location 40 and as referenced by directional arrow 46 in FIG. 1. The lead-in angle 36 passes through the underside mounting location 40 and, upon exiting the opposite side edge, biasingly engages against the underside of the electrical connector housing 40, in order to securely and immovably secure the connector in a "hard-connected" fashion to the electric motor body 12.

An electrical conduit 48 extends from the connector housing to the DC motor 12 and communicates with an input plug 50 (see FIG. 1) engaged with the connector 14. The plug in turn being formed at an end of an extending wire harness 52, which is desired to be connected to the DC motor 12.

An associated method is also provided for forming and attaching a bracket for communicating a connector with the DC motor and includes the steps of fashioning an elongated and substantially flattened bracket of a resilient material, attaching a first end of the bracket to a surface location of the electric motor, and engaging the connector with a second projecting end of the bracket. Additional steps include forming the underside projection in the bracket to provide biasing stand-off, as well as bending the second projecting (tab) end in order to define a lead-in angle for engaging the connector.

Having described my invention, other and additional preferred embodiments will become apparent to those skilled in the art to which it pertains, and without deviating from the scope of the appended claims. In particular, it is envisioned that the bracket can be constructed from other materials or shaped in other desired fashion, while still retaining the desired features of fixed engagement of the connector, as well as buss/squeak/rattle prevention.

We claim:

1. An assembly for securing a connector to an electric motor, comprising:
   an elongated bracket having a specified shape and size and constructed of a spring steel material;
   at least one screw fastener securing said bracket at a first end to a supporting location associated with the electric motor;
   a downwardly projecting portion associated with an intermediate location of said bracket and biasing said bracket in an angled fashion relative to the motor; and
   an extending location of said bracket arrayed in offset fashion relative a surface and including an end-angled tab adapted to receive the connector in securely engaged fashion.

2. The bracket as described in claim 1, said bracket exhibiting a specified shape and size and further comprising a spring steel material.

3. The bracket as described in claim 1, further comprising a pair of screw fasteners for securing said bracket to the motor.

4. The bracket as described in claim 1, said bracket exhibiting a specified shape and size, a wire harness input securing to the connector, an electrical conduit extending from the connector and securing at an opposite end to the motor.

5. An assembly for securing a connector to an electric motor, comprising:
   an elongated bracket secured to a supporting location associated with the electric motor; and
   an extending location of said bracket arrayed in offset and upwardly biased fashion relative a surface of the motor and adapted to receive the electrical connector in securely engaged fashion, said bracket further comprising a substantially intermediate located and projecting portion abutting the motor surface, said elongated bracket extending in angled fashion relative to the motor surface to support said connector thereupon.

6. A method of securing a connector to an electric motor, comprising the steps of:
   fashioning an elongated and substantially flattened bracket of a resilient material;
   forming a projection on an underside surface of said bracket in biasing contact with the electric motor and in order to offset said projecting end of said bracket from the motor surface;
   attaching a first end of said bracket to a surface location of the electric motor; and
   engaging the connector with a second projecting end of said bracket.

7. The method as described in claim 6, further comprising the step of bending said second projecting bracket end and in order to define a lead-in angle for engaging the connector.

8. The method as described in claim 6, further comprising the step of forming a pair of apertures in said bracket for receiving a pair of mounting screws to secure to the motor.

9. The method as described in claim 6, said step of forming an underside projection further comprising applying a punch press to an opposite upper surface of said bracket.

10. The method as described in claim 6, further comprising the step of biasing said attached bracket in a buss, squeak and rattle preventative fashion.

* * * * *